United States Patent Office 3,269,849
Patented August 30, 1966

3,269,849
FIBROUS REFRACTORY
Mario J. Caprio and Rudolf F. Krisleit, New Kensington, Pa., assignors to Aluminum Company of America, Pittsburgh, Pa., a corporation of Pennsylvania
No Drawing. Filed Dec. 11, 1964, Ser. No. 417,780
5 Claims. (Cl. 106—64)

This invention relates to refractory compositions and to a method for their preparation. More particularly, this invention relates to a new and improved heat insulating refractory which can be used in contact with molten, nonferrous metals having melting points below about 1000° C., e.g. molten aluminum and aluminum base alloys.

Numerous insulating refractories now commercially available exhibit adequately low thermal conductivity. In addition, several of these have acceptable resistance to metal attack, i.e. chemical reaction or wetting. These materials are, however, lacking one or more of the properties which an acceptable refractory should possess, i.e. dimensional stability, spall resistance, good machinability, and resistance to thermal and mechanical shock.

Refractory compositions employing an adhesive, such as calcium aluminate cement, as a bonding agent in combination with refractory aggregates such as diatomaceous earth, silica, magnesia, clay, alumina, expanded shale, crushed firebrick, mineral wool, fiber glass, asbestos and the like or combinations of such aggregates, in various proportions and formulations have been known. Nevertheless, such refractory compositions have not possessed the requisite properties enumerated above.

It has now been discovered that an insulating refractory possessing the desired properties may be produced from a composition which includes fibrous materials containing silica-alumina, or potassium titanate; an asbestos fiber, a calcium aluminate binder, and certain fluorides such as cryolite.

It is therefore an object of this invention to provide a heat insulating refractory composition exhibiting characteristics of low thermal conductivity, resistance to wetting and dimensional stability.

It is a further object of the invention to provide a heat insulating refractory composition which will resist thermal and mechanical shock and resist spalling.

Yet another object of the invention is to provide a heat insulating refractory composition which exhibits good machineability.

These and other objects will be more fully understood and appreciated from the following detailed description which is exemplary and explanatory of the invention but not restrictive thereof.

The refractory of the present invention in its broader aspect comprises a dry mixture of certain fibrous materials, a hydraulic setting binder or cement and a fluoride material; adapted to be mixed with water to form a slurry which is subsequently pressed into a predetermined form which may have a slab or board-like configuration and cured at elevated temperatures to establish a ceramically bonded heat insulating refractory. The binder or bonding agent is preferably a calcium aluminate cement such as Alcoa CA-25 Cement. An asbestos fiber is employed along with other suitable fibrous materials such as an alumina-silica fiber or potassium titanate fiber and a relatively small portion of cryolite. Among the commercially available alumina-silica fibers are the materials sold under the trade names of Fiberfrax and Kaowool. Tipersul is a trade name for an available potassium titanate fiber. In addition, known adhesive and filler materials may be added to the composition.

The general formulation of the invention comprises 40 to 60% by weight of asbestos fiber; 25 to 20% by weight of calcium aluminate cement; 5 to 2.5% by weight of cryolite; and 30 to 20% by weight of a fibrous material selected from the group consisting of fibrous alumina-silica which is refractory and substantially inert toward molten aluminum and fibrous potassium titanate. The alumina-silica fibrous material preferably consists of about equal parts of both fibrous components. It is, however, only necessary that the proportions of the two components are such that the resultant alumina-silica fibrous material is refractory and substantially inert toward molten aluminum. For example, an alumina-silica fibrous material having 99% silica, such as the material sold under the trade name Refrasil, may be used. Alternatively, fibrous potassium titanate may be used in place of the alumina-silica fibrous material. It has been found that the addition of more than 60% by weight of asbestos fiber results in a refractory which lacks strength. On the other hand, if the alumina-silica or potassium titanate component exceeds 30% by weight, the resultant refractory exhibits undesirable brittleness.

In preparing the refractory board, approximately 300% water, by weight of total solids, is added to the dry composition. Mixing may be accomplished by mechanical means such as a Hobart Mixer, if desired. The resulting slurry is pressed into a slab or board-like form at about 1000 p.s.i. and is thermally cured at temperatures in excess of 1400° F. and preferably from about 1400° F. to 2000° F. with a maximum temperature rise of 100° F. per hour. The preferred curing period should be at least about 2 hours for each inch of thickness of the slab and preferably about 6 to 8 hours. The curing process results in driving off both mixing water and water of crystallization, and the formation of a ceramic bond. Optionally, the slab may be autoclaved prior to curing.

Refractories made from these formulations have been found to have a low thermal conductivity of about 2–4 B.t.u./hr./ft.$^2$/° F./in. The machinability has been found to be superior to known refractories with fewer ragged portions and broken fibers appearing on machined edges. The improved dimensional stability which our refractory exhibits has resulted in no appreciable shrinkage and an absence of cracking and spalling. These refractories have also exhibited good resistance to thermal shock.

While improved properties result from any formulation falling within the ranges stated above, the preferred range comprises 45 to 55% by weight of asbestos fiber, 23 to 21% by weight of calcium aluminate cement, 3.5 to 2.5% by weight of cryolite, and 28 to 22% by weight of either fibrous alumina-silica or fibrous potassium titanate. The preferred composition comprises 50% by weight of asbestos fiber, 25% by weight of alumina-silica fibrous material or fibrous potassium titanate, 3% by weight cryolite, and 22% by weight of calcium aluminate cement.

The following examples are illustrative and explanatory of portions of the invention and are not restrictive thereof. In all examples the specified proportions of ingredients are stated in parts by weight of total solids.

Example 1

A fibrous heat insulating refractory board comprising 50% asbestos fiber, 25% alumina-silica fiber, 22.5% calcium aluminate cement and 2.5% cryolite was cured at 1400° F. To determine the resistance to attack by molten aluminum alloys, the board was subjected to an alternate immersion test wherein each cycle consisted of a three and one-half hour immersion in an aluminum base zinc-magnesium alloy held at 1350° F. and a one hour holding period at room temperature out of the metal bath. After five cycles the board showed excellent resistance to both metal attack and cracking. This is particularly significant in view of the fact that the aluminumzinc-magnesium alloy ordinarily will vigorously attack the usual refractory insulation materials employed in contact with molten aluminum.

*Example 2*

A board of the same composition as that used in Example 1 was subjected to a twenty-two hour continuous immersion in an aluminum base zinc-magnesium alloy held at 1400° F. The board exhibited no signs of metal attack or cracking.

*Example 3*

An insulating refractory comprising 50% asbestos fiber, 25% fibrous potassium titanate, 20% calcium aluminate cement, and 5% cryolite was subjected to five cycles in the twenty-two hour immersion test. The board showed no signs of any metal attack.

*Example 4*

The composition of Example 3 with fibrous alumina-silica material being substituted for fibrous potassium titanate, was subjected to five cycles in the twenty-two hour immersion test with the same improved results.

*Example 5*

A fibrous heat insulating refractory board comprising 50% asbestos fiber, 25% alumina-silica fiber, and 25% calcium aluminate cement was subjected to a severe 100 hour prolonged immersion test in an aluminum base zinc-magnesium alloy held at 1400° F. At the end of this period, the penetration of the reaction products into the board ranged from ⅛ inch to ¼ inch. A second prolonged immersion of 100 hours was performed on a board composed of the same composition with the addition of 2.5% cryolite. This board exhibited no appreciable penetration of reaction products at the end of the immersion period.

*Example 6*

A fibrous heat insulating refractory board comprising 50% asbestos fiber, 25% fibrous potassium titanate, and 25% calcium aluminate cement was subjected to a severe 100 hour prolonged immersion test in an aluminum base zinc-magnesium alloy held at 1400° F. At the end of this period, the penetration of the reaction products ranged from ½ inch to ¾ inch. A board composed of the same composition with the addition of 2.5% cryolite was subjected to the same test and exhibited no appreciable penetration of reaction products at the end of 100 hours.

Whereas particular embodiments of the invention have been described above for purposes of illustration, it will be evident to those skilled in the art that numerous variations of the details may be made without departing from the invention as defined in the appended claims.

We claim:

1. A ceramically bonded fibrous heat insulating refractory composition consisting essentially of 40 to 60% by weight of asbestos fiber; 25 to 20% by weight of calcium aluminate cement; 5 to 2.5% by weight of cryolite; 30 to 20% by weight of a fibrous material selected from the group consisting of fibrous alumina-silica which is refractory and substantially inert toward molten aluminum and fibrous potassium titanate, having a thermal conductivity of about 2–4 B.t.u./hr./ft.$^2$/° F./in.

2. A ceramically bonded fibrous heat insulating refractory composition consisting essentially of 45 to 55% by weight of asbestos fiber; 23 to 21% by weight of calcium aluminate cement; 3.5 to 2.5% by weight of cryolite; 28 to 22% by weight of a fibrous material selected from the group consisting of fibrous alumina-silica which is refractory and substantially inert toward molten aluminum and fibrous potassium titanate, having a thermal conductivity of about 2–4 B.t.u./hr./ft.$^2$/° F./in.

3. A method of producing a ceramically bonded heat insulating refractory slab of a fibrous refractory composition consisting essentially of 40 to 60% by weight of asbestos fiber; 25 to 20% by weight of calcium aluminate cement; 5 to 2.5% by weight of cryolite; 30 to 20% by weight of a fibrous material selected from the group consisting of fibrous alumina-silica which is refractory and substantially inert toward molten aluminum and fibrous potassium titanate; consisting essentially of mixing said composition with about 300% water by weight of total solids; compressing the resulting slurry into slab form at a pressure of about 1000 pounds per square inch and curing said slab at a temperature in excess of 1400° F. for a period of at least two hours for every inch of slab thickness.

4. The method of claim 3 wherein the curing temperature does not exceed 2000° F.

5. The method of claim 3 wherein the slab is autoclaved prior to curing.

References Cited by the Examiner

UNITED STATES PATENTS

| | | | |
|---|---|---|---|
| 2,509,599 | 5/1950 | Hollenberg | 106—99 |
| 2,793,128 | 5/1957 | Emhiser | 106—64 |

References Cited by the Applicant

UNITED STATES PATENTS

| | | |
|---|---|---|
| 2,516,892 | 8/1950 | Lobaugh. |
| 2,793,128 | 5/1957 | Emhiser. |
| 3,014,872 | 12/1961 | Scott. |
| 3,017,318 | 1/1962 | Labino. |
| 3,079,267 | 2/1963 | Konrad. |

TOBIAS E. LEVOW, *Primary Examiner.*

J. POER, *Assistant Examiner.*